May 21, 1940.  W. A. BARY ET AL  2,201,147
PNEUMATIC AUTOMOBILE LIFT
Filed Nov. 24, 1937  2 Sheets-Sheet 1

WOLDEMAR A. BARY
ALEXIS JACKSON
INVENTOR

BY John P. Nixonow
ATTORNEY

May 21, 1940.  W. A. BARY ET AL  2,201,147
PNEUMATIC AUTOMOBILE LIFT
Filed Nov. 24, 1937  2 Sheets-Sheet 2
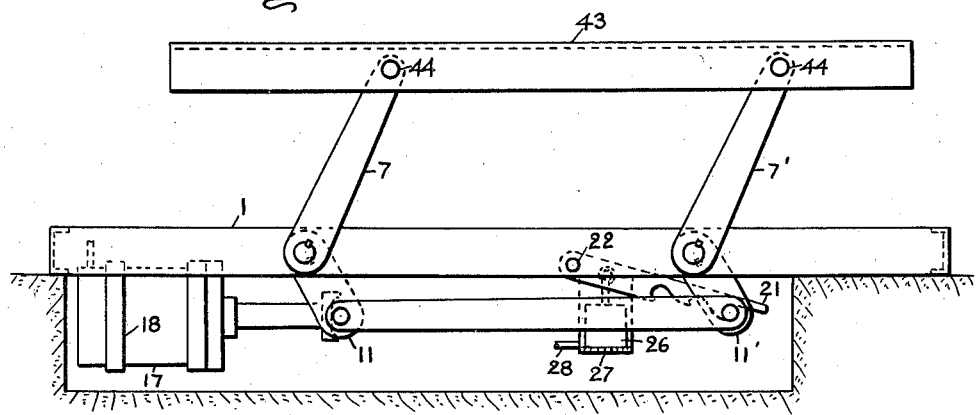
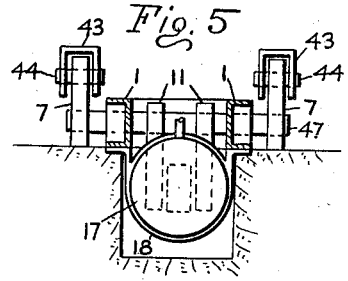
WOLDEMAR A. BARY
ALEXIS JACKSON
INVENTORS
BY John P. Kiskonow
ATTORNEY Patented May 21, 1940

2,201,147

UNITED STATES PATENT OFFICE 2,201,147

PNEUMATIC AUTOMOBILE LIFT

Woldemar A. Bary, New York, and Alexis Jackson, Astoria, N. Y., assignors to Vadim S. Makaroff, New York, N. Y.

Application November 24, 1937, Serial No. 176,208

6 Claims. (Cl. 254—91)

Our invention relates to automobile lifts and has particular reference to lifts or lifting devices for automobiles, various other vehicles and other objects.

An important object of our invention is to provide a lift with its mechanism concealed below the floor level of a garage or repair shop, the only exposed parts being two beams or rails on lifting arms for supporting a load and raising it to a desired elevation, the rails and the arms leaving a passage under the load thereby rendering the object lifted, such as an automobile, accessible underneath for repairs, lubrication, etc.

Another object of our invention is to provide a lift with rails for supporting an automobile or a similar vehicle, the rails being adapted to remain horizontal while being raised. For this purpose we connect the rails with the base by two sets of pivoted arms in such manner that the whole system represents two hinged or flexible parallelograms disposed side by side, the rails remaining at all times parallel to the base.

Another object of our invention is to provide a motor, preferably horizontal so as to occupy the least depth below the floor, adapted to turn one set of arms for raising them with the rails, the other set of arms being then raised through their connections with the first set. In order to facilitate the operation of raising the arms when they are in their lowest position and almost horizontal, we provide a second set of arms or lugs rigidly connected with the respective set of arms, the lugs being also connected together by pivoted longitudinal bars thereby forming a second set of hinged parallelograms.

The lugs extend at an angle to the arms so that they are in the most favorable position to be turned by a horizontal motor when the upper arms are in the least favorable position or collapsed to the ground.

Another object of our invention is to provide a locking device for holding the rails in an elevated position. We also provide an auxiliary motor for releasing the locking device when the motor is set in a position for lowering the rails. For this purpose we prefer to use a ratchet bar pivotally supported on the base of the machine and successively engaging by its teeth the rod connecting lugs at one end of the base. We also provide an air cylinder with a piston adapted to release the ratchet bar when the cylinder is energized. This arrangement can be preferably used when the motor for raising the arms is also made in the form of an air cylinder with a piston.

Another object of our invention is to provide a manual control for operating the air cylinders. For this purpose we provide a manually operable valve in a pipe connecting the lifting cylinder with a source of compressed air or other compressed fluid. We also provide an automatic check valve in the pipe between the cylinder and the manual valve to prevent a leakage through the main valve. We provide a separate manually operable valve for the ratchet releasing auxiliary cylinder. We also provide a valve for releasing pressure in the lifting cylinder, this valve being opened by a lug extending from the ratchet releasing valve in such manner that pressure in the cylinder is released when compressed fluid is admitted into the releasing cylinder.

As a modification we provide lifting arms with extensions below the shafts, the extensions being operatively connected with an air cylinder or electric motor for simultaneously and uniformly raising the arms at both ends of the lift.

With our arrangement of two sets of parallelograms for operating the supporting rails two sets of air cylinders can be used, one cylinder for each set of arms. The parallel arrangement of the lifting arms will insure a uniform lift for the rails regardless of the load distribution, even if the rails are replaced by some other lifting or load supporting devices, such as a platform, cross bars, etc.

Still another object of our invention is to provide hinged approach plates at the ends of the rails to facilitate bringing an automobile on the rails from the floor, the plates remaining at the floor on the lower portions of the arms when the rails are raised.

Our invention is more fully described in the accompanying specification and drawings in which—

Fig. 4 is an elevational view of a modified construction.

Fig. 5 is an end view of the same partly in section.

Figure 1:
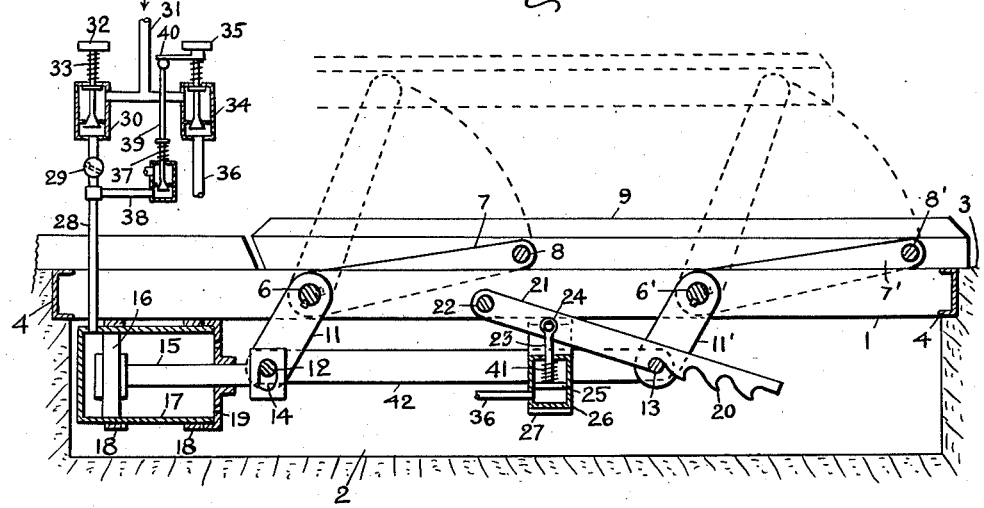
Fig. 1 is a sectional elevation of our lift in a lowered position.
Figure 2:
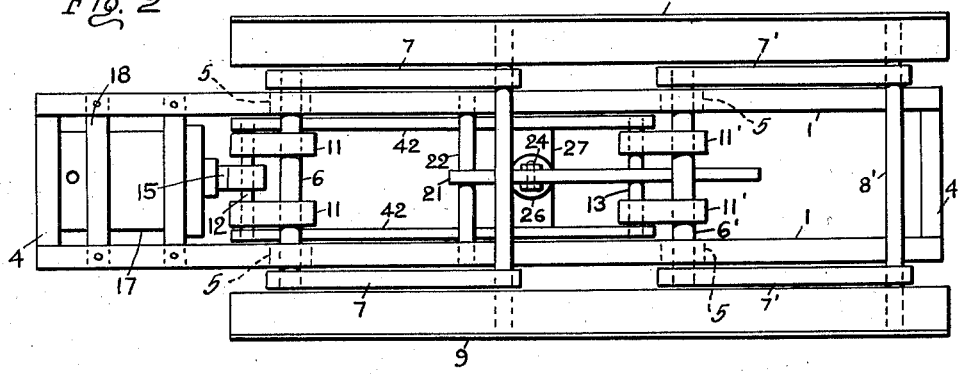
Fig. 2 is a top plan view of the same.
Figure 3:
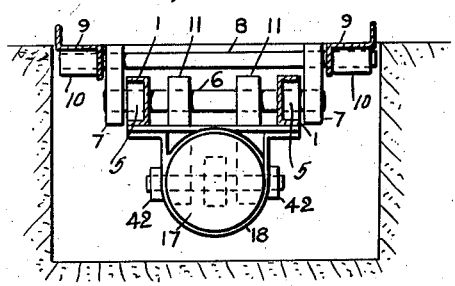
Fig. 3 is an end view of the same partly in section.

Our automobile lift consists of a base formed of two beams 1 placed in an excavation or pit 2 below the level of a floor 3 in a shop or garage. The beams may be of any cross-sectional shape suitable for this purpose and are shown as channel bars.

The channel bars or beams 1 are connected together at the ends by cross bars 4. Bearings 5 are fitted in the beams for shafts 6 and 6'. Arms 7 and 7' are rigidly mounted on the outer ends of the shafts and have bearings at the ends for shafts 8 and 8'. The outer ends of the shafts 8 and 8' are fitted in the inner or vertical flanges of rails or beams 9 being journaled in bearing blocks 10 attached to the rails. The arms form two parallel parallelograms with the rails 9 and beams 1 so that the rails remain horizontal for all positions of the arms. The shafts 6 and 6' have also lower arms or lugs 11 and 11' rigidly mounted (on keys, for instance) thereon and provided with bearings for short shafts or pins 12 and 13. The pin 12 passes through an elongated hole 14 in the enlarged end of a rod 15 having a piston 16 on the other end and slidably fitted in a cylinder 17. The latter is mounted on brackets or braces 18 supported on the beams 1. The rod 15 slides in a hole in the center of a cover 19 in the front end of the cylinder. The shaft 13 is engaged by teeth 20 of a locking bar 21 rotatively mounted on a shaft 22 supported in the beams 1. A rod 23 is pivotally connected to the bar 21 at 24 and has a piston 25 on the other end sliding in a cylinder 26. A spring 41 tends to raise the piston thereby pressing the bar 21 against the shaft or pin 13. The cylinder 26 is mounted on a bracket 27 supported by its ends under the beams 1. A pipe 28 extends from the cylinder 17 and is connected with a pipe 31 through a check valve 29 and a control valve 30 having a handle 32 and a spring 33 for closing the valve. The pipe 31 is connected with a source of compressed air (not shown) or other fluid under compression. A second valve 34 with a handle 35 connects the pipe 31 with the cylinder 26 by a pipe 36. A third valve 37 is connected with the pipe 28 by a pipe 38 and has a rod 39 engaged by a lug 40 on the handle of the valve 34 being thereby adapted to release air from the cylinder 17 when air is admitted into the auxiliary cylinder 26.

The operation of our lift is as follows.

The rails 9 normally rest in recesses in the floor 3 so that their flat sides are level with the floor. An automobile or other vehicle is driven or moved on the rails until all its wheels rest on them. The valve handle 32 is then depressed, opening the valve 30 and admitting compressed air into the cylinder 17 through the check valve 29 which prevents the return flow of the air. The lugs 11 are connected with the lugs 11' by longitudinal bars 42 forming a second set of parallelograms with the beams 1. The lugs are set at an angle to the arms 7 and 7', preferably approaching 90° so that the lower parallelograms are expanded when the upper parallelograms are folded or collapsed. The lower parallelograms therefore provide the greatest torque when the upper parallelograms are in the least favorable position for lifting the load. The lugs 11 and 11' tend to equalize the movements of the arms 7 and 7' from the beginning when the upper parallelograms are practically nonexistent so that the certain play in the bearings may cause distortion of the positions of the arms under uneven loads. The pin 13 successively slides from one tooth 20 to the next while the arms 7 and 7' are rotated until they reach the final elevation at which the system will be retained by the corresponding tooth 20 independently of the air cylinder. For lowering the beams or rails 9 the valve 34 is opened by depressing the handle 35 thereby admitting air into the cylinder 26. The piston 25 is then raised pushing the bar 21 upward and releasing the pin 13 from the tooth 20. Simultaneously the lug 40 will depress the valve stem 39, opening the valve 37 and releasing air from the cylinder 17. The piston 16 will therefore recede into the cylinder, releasing the lugs 11 and 11' and the arms 7 and 7' for their downward movement.

A modified arrangement is shown in Figs. 4 and 5, this lift being specially adapted for raising an automobile by its axles leaving its wheels free and exposed. The arms 7 and 7' in this modification are fitted by their ends in inverted channel bars 43 and are held by short shafts or pins 44. The bars 43 are spaced closely together so as to fit under the axles of an automobile between its wheels.

We claim as our invention:

1. An automobile lift comprising a frame, front and rear arms rotatively supported on the sides of the frame, means on the free ends of the arms to support an automobile, an air motor, an air valve for admitting compressed air into the motor, means to rotate the arms by the motor for raising the automobile, means to lock the arms in the raised position, an air cylinder, a piston movably fitted in the cylinder, means to release the locking means by the piston when compressed air is admitted into the cylinder, and a handle on the air valve for opening and closing the air passage for the air cylinder, the valve in the open position being adapted to release the air from the motor.

2. An automobile lift comprising a frame, front and rear arms rotatively supported on the sides of the frame, rails extending between the front and rear arms and hingedly connected to the free ends of the arms forming a support for an automobile, the front and rear arms being substantially parallel thereby forming hinged parallelograms with the rails and sides of the frame, lugs rigidly connected with the arms and extending at an angle thereto, links hingedly connecting the free ends of the lugs and extending from the front to the rear lugs, the front and rear lugs being parallel thereby forming a second set of hinged parallelograms, shafts connecting the free ends of the lugs, a fluid motor operatively connected with the lug shafts for rotating the arms, a locking ratchet arm pivotally connected with the frame at one end, the teeth of the arm being adapted to engage the front lug shaft for supporting the arms in the raised position, means to yieldably press the arm against the lug shaft, means including a fluid cylinder for releasing the locking arm from engagement with the lug shaft, and means to release the fluid from the motor by admitting fluid into the cylinder.

3. An automobile lift comprising a frame, a front and rear arms rotatively supported on the sides of the frame, rails extending between the front and rear arms and hingedly connected to the free ends of the arms forming a support for an automobile, the front and rear arms being substantially parallel thereby forming hinged parallelograms with the rails and sides of the frame, lugs rigidly connected with the arms and extending at an angle thereto, links hingedly connecting the free ends of the lugs and extending from the front to the rear lugs, the front and rear lugs being parallel thereby forming a second set of hinged parallelograms, shafts connecting the free ends of the lugs, a cylinder rigidly mounted on the under side of the frame, a piston slidably fitted in the cylinder, the piston and the cylinder being in a substantially parallel alignment with the frame, means to admit compressed fluid into the cylinder, and operating connections between the piston and the shaft for raising and lowering the rails.

4. An automobile lift comprising a frame, front and rear arms rotatively supported on the sides of the frame, rails extending between the front and rear arms and hingedly connected to the free ends of the arms forming a support for an automobile, the front and rear arms being substantially parallel thereby forming hinged parallelograms with the rails and sides of the frame, lugs rigidly connected with the arms and extending at an angle thereto, links hingedly connecting the free ends of the lugs and extending from the front to the rear lugs, the front and rear lugs being parallel thereby forming a second set of hinged parallelograms, shafts connecting the free ends of the lugs, a fluid motor operatively connected with the lug shafts for rotating the arms, a locking ratchet arm pivotally connected with the frame at one end, the teeth of the arm being adapted to engage the front lug shaft by gravity for supporting the arms in the raised position, an air cylinder supported on the frame, a piston in the cylinder operatively connected to the arm, and means to admit compressed fluid into the cylinder for raising the locking arm thereby releasing it from the front lug shaft.

5. An automobile lift comprising a frame, front and rear arms rotatively supported on the sides of the frame, rails extending between the front and rear arms and hingedly connected to the free ends of the arms forming a support for an automobile, the front and rear arms being substantially parallel thereby forming hinged parallelograms with the rails and sides of the frame, lugs rigidly connected with the arms and extending at an angle thereto, links hingedly connecting the free ends of the lugs and extending from the front to the rear lugs, the front and rear lugs being parallel thereby forming a second set of hinged parallelograms, a fluid motor operatively connected with the lugs, means to admit compressed fluid into the motor, means to exhaust the fluid from the motor, means to rotate the arms by the motor for raising the automobile, means to lock the arms in the raised position, a fluid cylinder, a piston movably fitted in the cylinder and operatively connected to the locking means, and means to admit the fluid into the cylinder for moving the piston thereby releasing the locking means and means to control the fluid exhausting means for the motor by the fluid admitting means for the cylinder.

6. An automobile lift comprising a frame, front and rear arms rotatively supported on the sides of the frame, means on the free ends of the arms to support an automobile, a fluid motor, a fluid valve for admitting compressed fluid into the motor, means to rotate the arms by the motor for raising the automobile, means to lock the arms in the raised position, a fluid cylinder, a piston movably fitted in the cylinder operatively connected with the locking means, a valve adapted to admit compressed fluid into the cylinder, means to prevent the reverse flow of fluid through the motor valve, and means to release the fluid from the motor by admitting the fluid into the cylinder valve for admitting compressed fluid into the cylinder.

WOLDEMAR A. BARY.
ALEXIS JACKSON.